July 25, 1933.  A. DIEHL  1,919,777

HUMIDIFIER

Filed July 29, 1932

Inventor
A. Diehl
By
Attorneys

Patented July 25, 1933

1,919,777

UNITED STATES PATENT OFFICE

ARTHUR DIEHL, OF MILWAUKEE, WISCONSIN

HUMIDIFIER

Application filed July 29, 1932. Serial No. 625,697.

This invention appertains to a novel means for purifying and humidifying air for buildings and has for one of its primary objects the provision of a compact device of this character of a portable nature, which will effectively accomplish its purpose.

Another salient object of my invention is to provide a humidifying device for the rooms of a home or office embodying a tank for the reception of a liquid, with means for continuously delivering the liquid in the nature of a thin film above the liquid level in the tank and means for forcing the foul air through the liquid film and into the room, so that the same will be properly humidified.

A further important object of my invention is the provision of a fabric screen arranged at one side of the liquid film, so as to remove excess moisture from the air and particles of dirt therefrom, which may have accompanied the air through the liquid film.

A further important object of my invention is the provision of novel means for incorporating an electric heating element within the air outlet of the device, so that the device can be utilized as means for taking the chill off of the atmosphere of a room as well as cleansing and humidifying the air.

A further object of my invention is the provision of novel means for operating the air impeller and the pump for forcing the liquid to an elevated position to form the liquid film from a single motor and in proper conjunction with one another.

A further object of my invention is the provision of a device for purifying and humidifying air which is of a portable nature, but which can be effectively used in conjunction with the air intake pipe of a hot air heating furnace.

A still further object of my invention is to provide a device of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawing, in which:

Figure 1:
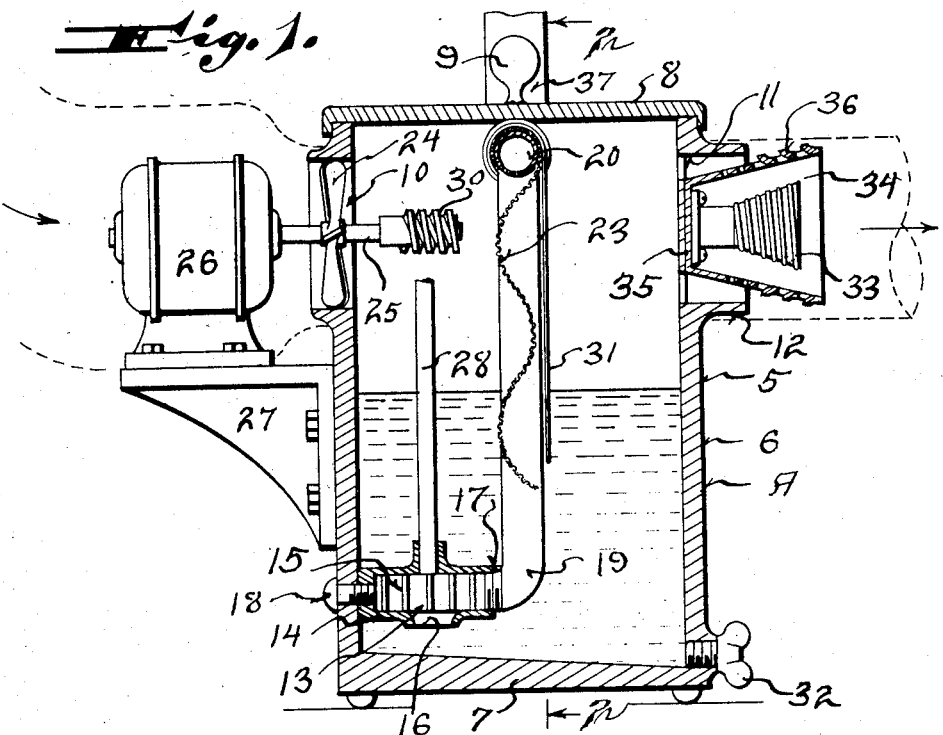
Figure 1 is a vertical section through my improved device.
Figure 2:
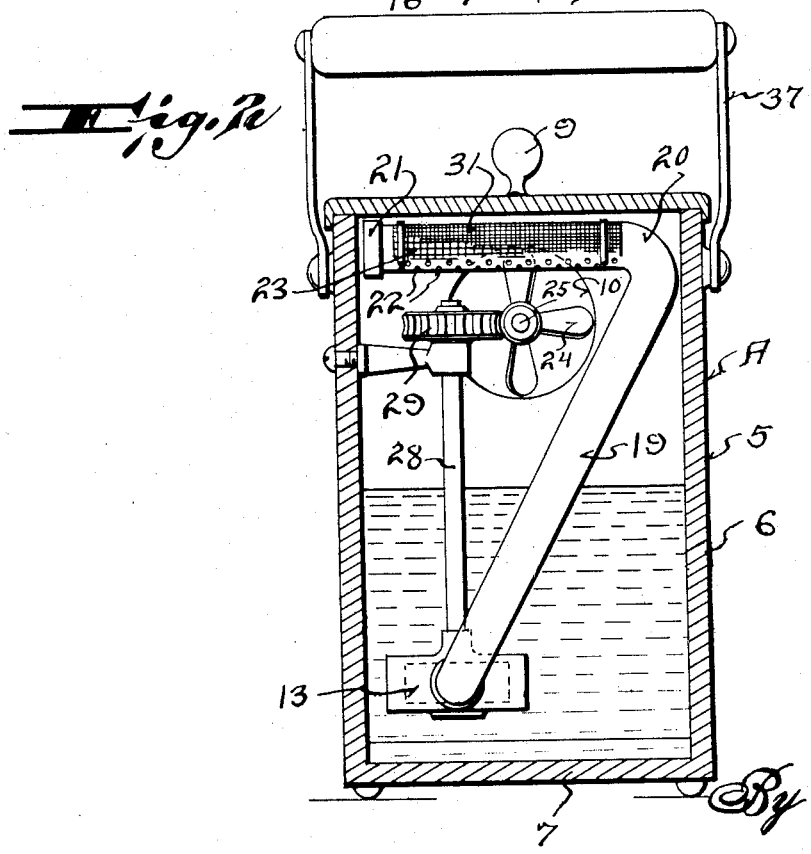
Figure 2 is a sectional view taken at right angles to Figure 1 substantially on the line 2—2 of Figure 1 looking in the direction of the arrows, the screens being eliminated to illustrate structural details in rear thereof.

Referring to the drawing in detail, wherein similar reference characters designate the corresponding parts throughout the several views, the letter A generally indicates my improved device which comprises a tank or casing 5, which can be formed of any desired material, such as aluminum or the like. This casing 5 can embody a cylindrical side wall 6, a bottom wall 7 and a removable top wall 8. This top wall 8 is made removable for the purpose of facilitating the cleaning of the tank and the filling of the tank with water or other desired liquid. A hand grip 9 can be provided for the cover 8 to facilitate the manipulation thereof. The side wall 6 at diametrically opposed points is provided with an air intake opening 10 and an air outlet opening 11, which can be surrounded by a collar or sleeve 12. The air inlet and outlet openings 10 and 11 are arranged adjacent to the top of the tank and above the liquid level thereof.

In accordance with my invention I arrange a liquid pump 13 within the tank adjacent to the lower end of the tank and this pump can be of any desired character or make, and in the present instance, I have shown the same to be of the rotary type and to include a stationary casing or stator 14 and a rotor 15. The stator or casing 14 is provided with a liquid inlet 16 and a liquid outlet 17. Suitable fastening elements 18 can be employed for connecting the pump to the casing. Connected with the pump outlet 17 is a liquid conductor pipe 19 which extends to the top of the tank and terminates in a horizontally disposed leg 20. This leg 20 is closed at its outer end by the use of a suitable cap or the like 21, but is provided with a plurality of minute perforations 22 throughout its length. Depending from the horizontal leg 20 is a coarse screen 23 which can be made of metal if so desired. When the pump is in operation, the liquid in the tank is forced through the perforations 22 onto the screen 23 and the liquid falls down the screen in the nature of a thin film.

By referring to Figure 1 of the drawing, it will be noted that this screen is arranged between the air intake and outlet openings 10 and 11.

In order to force the air through the tank, I employ a fan or propeller 24, which is arranged within the intake opening 10. This fan or propeller 24 can be driven in any desired manner and as shown, the same is secured directly to the armature shaft 25 of an electric motor 26. The electric motor can be bolted or otherwise secured to a bracket 27 fastened to the outer face of the tank 5.

I also provide means for operating the pump 13 from the electric motor 26, so that the pump will be actuated in conjunction with the air propeller. Thus, the pump shaft 28 which is secured to the rotor 15 of the pump is provided with a worm wheel 29, which meshes with a worm 30 connected with the armature shaft 25 of the motor.

Obviously, as the propeller sucks in the contaminated air, the air will be forced through the thin film of water and out of the air outlet opening 11 into the room to be humidified.

I also provide means for preventing the air from carrying too much moisture therewith and to further aid in the preventing of carrying dust particles into the room. This means comprises a fabric screen 31 which is arranged between the metal screen 23 and the outlet opening. The fabric screen 31 can be suspended in any preferred manner and can be carried directly by the horizontal arm 20 of the liquid conducting pipe, if so desired.

A drain plug 32 can be provided for the lower end of the tank and this plug facilitates the cleaning and washing of the tank.

While under ordinary conditions water is used within the tank, obviously chemicals or medicines can be used therein instead of water and the device utilized for treating persons afflicted with pulmonary disorders.

In some instances it may be desirable to use my device for raising the temperature of the air. In such instances, I can place an electric heating element 33 in the path of the outgoing air. To facilitate the use of the electric heating element, I place the same within a shell 34 and secure the shell within the opening 11 by means of a supporting bracket or strap 35. The rear end of the shell is closed and the outer end is left open and the shell gradually flares toward its outer end. This shell projects beyond the sleeve 12 and is provided with struck-out louvers 36. These louvers catch a portion of the outgoing air and direct this air against the heating element. This prevents the burning out of the element and likewise insures the proper heating of the air.

From the foregoing description, it can be seen that I have provided a unitary device which effectively washes, humidifies, and cleanses air for the rooms of buildings. Owing to the construction of the device, the same is exceptionally useful in a home or office building as the same can be readily moved from one room to another. A bail handle 37 can be provided for facilitating the carrying of the device from one place to another.

However, it is to be understood that my device is susceptible for other uses besides that of being confined to a single room. Thus, the electric heating element 33 and shell 34 can be eliminated and the device can be connected with the air intake of a hot air furnace, so that the air delivered to the furnace will be humidified and cleansed.

The device is also particularly useful during the summer season and I can place ice cubes or the like within the tank and this will effectively lower the temperature of the room where the device is disposed.

Changes in details may be made without departing from the spirit or the scope of this invention, but what I claim as new is:

A device for humidifying and purifying the air comprising a casing for receiving a liquid, the casing having air intake and air outlet openings arranged at opposed points, a sleeve surrounding the air outlet opening, a pump in the casing, a liquid conducting pipe communicating with the outlet of the pump terminating in a horizontally disposed leg having a plurality of perforations throughout the length thereof, a coarse screen depending from the leg for receiving the liquid from the perforations, a fan causing the intake of the air from the intake opening and the outlet of air out of the outlet opening and through the screen, a shell disposed within the sleeve having a rear wall and a side wall provided with struck-out louvers for deflecting air into the shell, and an electric heating element disposed within the shell.

ARTHUR DIEHL.